US010687103B2

(12) United States Patent
Hurd et al.

(10) Patent No.: US 10,687,103 B2
(45) Date of Patent: *Jun. 16, 2020

(54) ALLOWING PRESENTATION CONTROL OF IMMEDIATE CONTENT INTERRUPTING DIGITAL TELEVISION CHANNEL PROGRAMMING

(71) Applicant: International Business Machines Corporation, Armonk, NY (US)

(72) Inventors: David W. Hurd, Westminster, CO (US); Tassanee K. Supakkul, Tarrant, TX (US); Mathews Thomas, Flower Mound, TX (US); Julio Wong, Pembroke Pines, FL (US)

(73) Assignee: International Business Machines Corporation, Armonk, NY (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/993,230

(22) Filed: May 30, 2018

(65) Prior Publication Data

US 2018/0278978 A1    Sep. 27, 2018

Related U.S. Application Data

(63) Continuation of application No. 13/441,988, filed on Apr. 9, 2012, now Pat. No. 9,998,780.

(51) Int. Cl.
| | | |
|---|---|---|
| H04N 21/40 | (2011.01) | |
| H04N 21/258 | (2011.01) | |
| H04N 21/41 | (2011.01) | |
| H04N 21/4147 | (2011.01) | |
| H04N 21/431 | (2011.01) | |
| H04N 21/433 | (2011.01) | |
| H04N 21/472 | (2011.01) | |
| H04N 21/485 | (2011.01) | |
| H04N 21/488 | (2011.01) | |
| H04N 21/81 | (2011.01) | |

(52) U.S. Cl.
CPC ... *H04N 21/25891* (2013.01); *H04N 21/4122* (2013.01); *H04N 21/4126* (2013.01); *H04N 21/4147* (2013.01); *H04N 21/4316* (2013.01); *H04N 21/4334* (2013.01); *H04N 21/47214* (2013.01); *H04N 21/485* (2013.01); *H04N 21/488* (2013.01); *H04N 21/814* (2013.01)

(58) Field of Classification Search
None
See application file for complete search history.

(56) References Cited

U.S. PATENT DOCUMENTS

| | | |
|---|---|---|
| 5,557,338 A | 9/1996 | Maze et al. |
| 2003/0007092 A1 | 1/2003 | Sonner et al. |
| 2004/0078814 A1* | 4/2004 | Allen ............... H04N 5/44513 725/47 |
| 2005/0273809 A1 | 12/2005 | Kendall et al. |

(Continued)

*Primary Examiner* — Cai Y Chen
(74) *Attorney, Agent, or Firm* — Aaron N. Pontikos

(57) ABSTRACT

A channel programming associated with a channel can be selected. The channel can be associated with a programming broadcasting system. The channel programming can be displayed upon a presentation device. An immediate content from a content delivery entity interrupting the presentation of the channel programming can be received. The channel programming and the immediate content can be simultaneously presented on the presentation device.

9 Claims, 4 Drawing Sheets

(56) References Cited

U.S. PATENT DOCUMENTS

| | | |
|---|---|---|
| 2008/0168491 A1 | 7/2008 | Carlson et al. |
| 2008/0313665 A1 | 12/2008 | Francis et al. |
| 2009/0015716 A1 | 1/2009 | Doedens et al. |
| 2009/0175358 A1 | 7/2009 | Gordon et al. |
| 2009/0235308 A1 | 9/2009 | Ehlers et al. |
| 2009/0307721 A1 | 12/2009 | Afram et al. |
| 2010/0031292 A1 | 2/2010 | Bakker et al. |
| 2010/0205628 A1 | 8/2010 | Davis et al. |
| 2010/0211972 A1 | 8/2010 | Howarter et al. |
| 2011/0285542 A1 | 11/2011 | Amsterdam et al. |

* cited by examiner

ALLOWING PRESENTATION CONTROL OF IMMEDIATE CONTENT INTERRUPTING DIGITAL TELEVISION CHANNEL PROGRAMMING

CROSS-REFERENCE TO RELATED APPLICATIONS

This application is a Continuation of U.S. patent application Ser. No. 13/441,988, filed on Apr. 9, 2012, which is incorporated herein by reference in its entirety.

BACKGROUND

The present invention relates to the field of digital content delivery and, more particularly, to allowing presentation control of immediate content interrupting digital television channel programming.

Frequently, there are several current events such as a disaster and/or an emergency that can often be urgent and can require immediate attention. For example, current events such an earthquake, a plane crash, an oil spill, a tornado watch, a flash flood, or a snow storm can be urgent events which can affect many residents of a local area. When such events occur, a broadcaster and/or content delivery provider (e.g., cable/satellite company) can select a time to deliver event information as live breaking news while regular programming can be running during the scheduled time. For example, a viewer's favorite show can be interrupted by a special report informing the viewer about an ongoing situation. Typically the length of a live breaking news bulletin can vary from very short (e.g., less than 1-2 minutes) to very long (e.g., over 15-30 minutes) depending on one or more factors such as severity level. Consequently, having news interrupting normal scheduled program can raise many issues which can negatively affect the viewer's experience. For example, viewers can be annoyed that the program they are watching can get abruptly interrupted by news not relevant to them.

One solution to minimize the interruption often utilizes scrolling text at the bottom of the TV screen. For example, the viewer may hear a beep to get their attention at the beginning following by the scrolling text. One disadvantage of this solution is the audio can often not be available. For example, when a viewer cannot see the scrolling text, the viewer can miss important information. Even when audio is available along with the text, it can still interrupt the current program. Further, the text can often be too small or can scroll too quickly for some viewers to view. Another disadvantage is this solution lacks video which can be extremely informative and useful to viewers. As such currently breaking news interrupts normal channel programming and can be too intrusive for many viewers.

BRIEF SUMMARY

One aspect of the present invention can include a system, an apparatus, a computer program product, and a method for allowing presentation control of immediate content interrupting digital television channel programming. A channel programming associated with a channel can be selected. The channel can be associated with a programming broadcasting system. The channel programming can be displayed upon a presentation device. An immediate content from a content delivery entity interrupting the presentation of the channel programming can be received. The channel programming and the immediate content can be simultaneously presented on the presentation device.

Another aspect of the present invention can include an apparatus, a computer program product, a method, and a system for allowing presentation control of immediate content interrupting digital television channel programming. A content engine can be configured to simultaneously receive a channel programming and an immediate content. The channel programming can be presented upon a presentation device communicatively linked to the content engine. The immediate content can interrupt the channel programming presentation. A data store can persist an immediate content, a channel content, or a preference associated with the immediate content.

DETAILED DESCRIPTION

Figure 1:
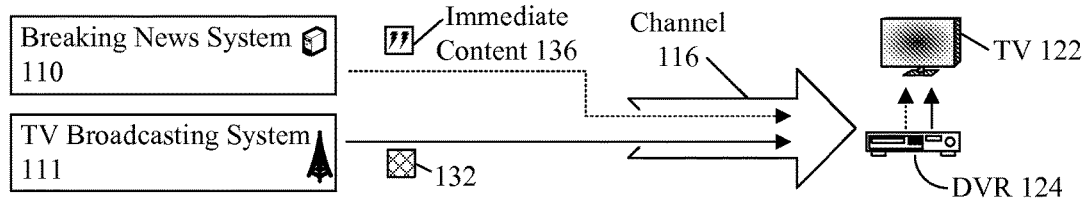
FIG. 1 is a schematic diagram illustrating a set of scenarios for allowing presentation control of immediate content interrupting digital television channel programming in accordance with an embodiment of the inventive arrangements disclosed herein.
Figure 1:
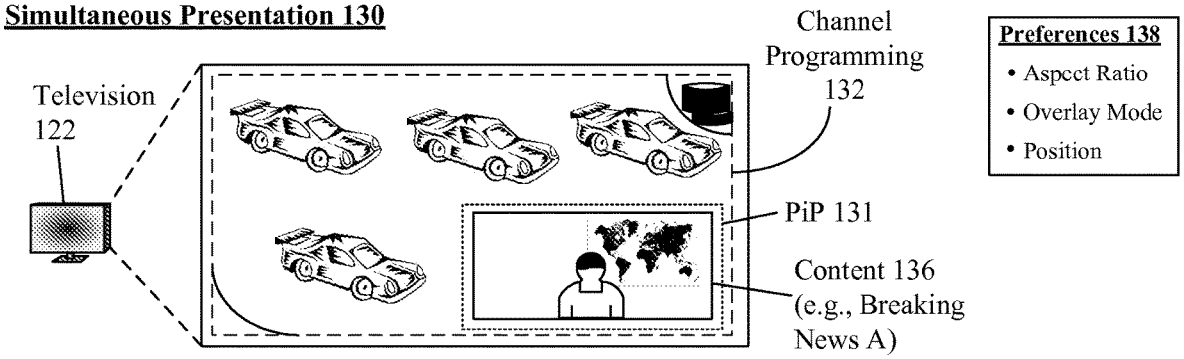
Figure 1:
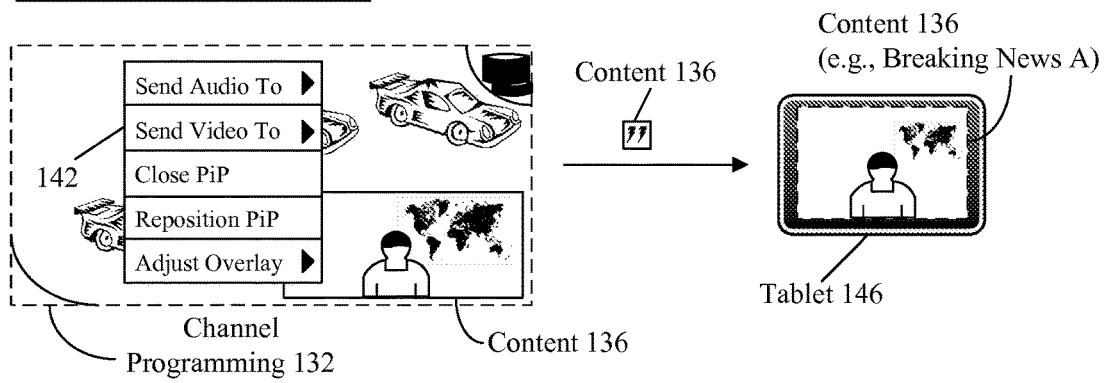
Figure 1:
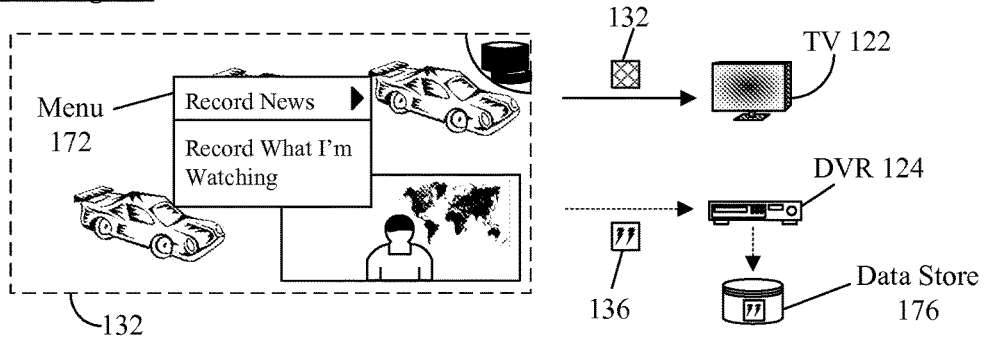

The present disclosure is a solution for allowing presentation control of content interrupting digital television channel programming. In the solution, a content engine can permit the management of content (e.g., breaking news) which can interrupt digital television channel programming. The engine can allow non-intrusive presentation of the content based on one or more user preferences. In one instance, the audio and/or video of the content can be conveyed to proximate devices. That is, the content can be distributed to a proximate device (e.g., tablet) which can be presented to a viewer in a non-intrusive manner. In one embodiment, the content can be "time shifted" enabling a viewer to conveniently record and/or playback content at any time. In the embodiment, content can be non-intrusively recorded while channel programming is presented simultaneously. For example, a breaking news can be recorded to allow channel programming (e.g., regularly scheduled program) to continue uninterrupted. In another embodiment, preferences can be leveraged to permit immediate content to interrupt channel programming. For example, preferences can be configured to allow a breaking news report to interrupt a viewer's favorite television show when the report is about severe tornado alert in a viewer's area.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a set of scenarios 100, 130, 140, 170 for allowing presentation control of immediate content interrupting digital television channel programming in accordance with an embodiment of the inventive arrangements disclosed herein. Scenarios 100, 130, 140, 170 can be present in the context of method 200, system 300, and/or embodiment 400. In scenario 100, a channel programming 132 and immediate content 136 (e.g., Breaking News A) can be conveyed to an end-user device such as a digital video recorder 124 simultaneously over the same channel 116. The programming 132 and news 136 can be concurrently presented on television 122 via one or more mechanisms (e.g., split-screen). In scenario 130, a picture-in-picture feature of television 122 can be leveraged to present immediate content 136 (e.g., Breaking News A) while viewing channel programming 132. In scenario 140, channel programming 132 can be presented within television 122 and immediate content 136 (e.g., Breaking News A) can be presented on computer 146 simultaneously. In scenario 170, immediate content 136 can be automatically time-shifted to a data store 176 associated with DVR 124 while programming 132 can be simultaneously presented on TV 122. The disclosure can permit immediate content 136 which normally interrupts channel programming 132 to be non-intrusively presented. For example, a special news report about an earthquake can be semi-transparently overlayed a car racing competition programming, enabling a viewer to continue viewing the programming while seeing news report information at the same time.

In scenario 100, a TV broadcasting system 111 can provide channel programming 132 to an end-user device such as a digital video recorder 124. System 111 can include traditional and/or non-traditional media provider including, but not limited to, a coaxial cable provider, a terrestrial satellite provider, over-the-air media provider, and the like. For example, system 111 can be a media provider supplying digital entertainment and broadband Internet access (e.g., COMCAST). Channel programming 132 can include an audio stream, a video stream, and the like. For example, programming 132 can be a thirty minute television show interspersed with commercial breaks. Programming 132 can be selected via a user action including, channel selection, content selection (e.g., pay-per-view), and the like. For example, a viewer can use a DVR 124 remote to select a favorite show currently broadcasted by system 111. It should be appreciated that programming 132 can include pre-recorded content stored within system 111, DVR 124, communicatively linked data store (e.g., data store 176), and the like.

Channel 116 can be a physical and/or a virtual channel over which programming 132 and/or news 136 can be distributed. For example, channel 116 can provide programming with shows about nature and wildlife. DVR 124 can be a set-top box which can be communicatively linked to a presentation device (e.g., TV 122). DVR 124 can include, but is not limited to, cable converter box, a personal video recorder (PVR), a media server, and the like. TV 122 can be a presentation device configured to display programming 132 and/or content 136. TV 122 can include, but is not limited to, a television set, a monitor, a video projector, and the like. TV 122 functionality can include, traditional and/or proprietary capabilities including, but not limited to, Picture-in-Picture, split-screen, multiple audio stream separation (e.g., Multichannel Television Sound), multiple content display, Descriptive Video Service, and the like.

Breaking news system 110 can be an immediate content 136 provider able to convey content 136 in real-time or near real-time. System 110 can include, but is not limited to a content management system, a content creation system, a content distribution system, and the like. For example, system 110 can include a Television station broadcasting a remote news report from a journalist conducting a live news broadcast. Breaking news 136 can be a content which can interrupt channel programming 132. News 136 can include, but is not limited to, a news broadcast, a current event broadcast, a news bulletin, and the like. For example, news 136 can include a media event such as a presidential press conference. That is, news 136 can be associated with a live electronic news gathering activity such as a current event coverage.

In scenario 130, programming 132 can be presented within the viewing area of television 112. In one embodiment, content can be presented utilizing preferences 138 which can be automatically and/or manually established. Preferences 138 can include, but is not limited to, aspect ratio, overlay mode, position, video settings, audio settings, content category, and the like. Content 136 can be presented within a picture-in-picture section 131 of the viewing area of television 122. In the scenario 130, the programming 132 audio/video can be presented normally while the video of the content 136 can be presented. That is, the audio of content 136 can be muted while content 136 video can be presented enabling non-intrusive viewing of content 136.

In scenario 140, menu 142 can be utilized to customize viewing of programming 132 and/or content 136. For example, menu 142 can be an on-screen menu associated with TV 122 and/or DVR 124. Menu 142 can enable multiple options for viewing content 136 easily. Options can include, but is not limited to, video options, audio options, notification options, forwarding options, and the like. For example, menu 142 can permit content 136 to be manually forwarded to proximate tablet 146 from a picture-in-picture view. That is, content 136 can be viewed and heard from tablet 146 concurrently with programming 132 presented on TV 122. It should be appreciated that content 136 can be automatically forwarded via menu 142, established preferences 138, and the like.

In scenario 170, content 136 can be time-shifted enabling programming 132 to be uninterrupted utilizing menu 172. Menu 172 can include options for recording content 136, content 136 playback, and the like. In one embodiment, content 136 can be recorded while programming 132 is viewed on TV 122. In the embodiment, content 136 can be persisted to a data store 176 of DVR 124. It should be appreciated that programming 132 can be recorded while content 136 is viewed. It should be understood that content 136 can be silently time-shifted utilizing controls associated with TV 122, and/or DVR 124 (e.g., remote control).

Drawings presented herein are for illustrative purposes only and should not be construed to limit the invention in any regard. It should be appreciated that a notification of content 136 can be presented on TV 122 prior to content 136 presentation. For example, a pop-up dialog and/or icon can be presented indicating content 136 is attempting to interrupt programming 132. It should be appreciated that the disclosure can leverage secondary audio program capabilities to provide support for multiple languages for programming 132 and/or breaking news 136. It should be understood that the disclosure can be utilized to non-intrusively present audio only feeds (e.g., radio news).

Figure 2:
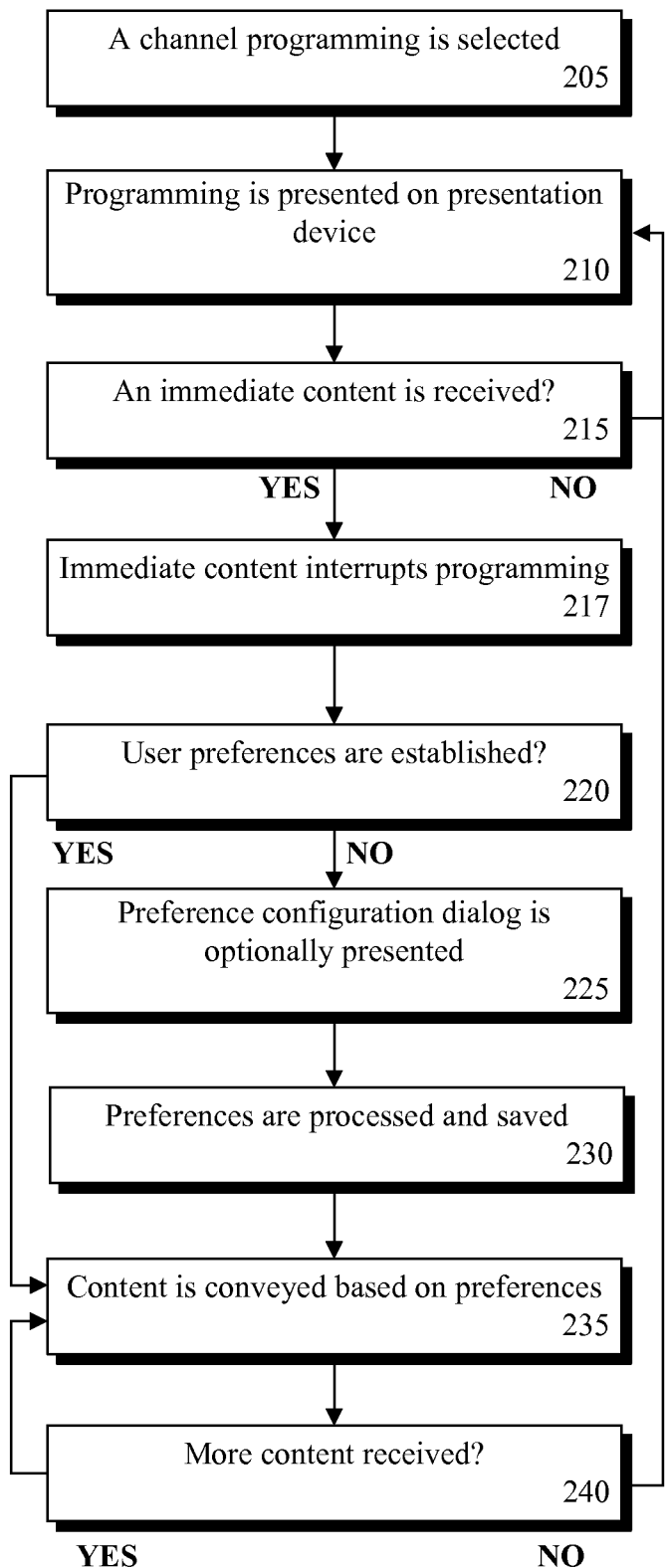
FIG. 2 is a schematic diagram illustrating a method for allowing presentation control of immediate content interrupting digital television channel programming in accordance with an embodiment of the inventive arrangements disclosed herein.

FIG. 2 is a schematic diagram illustrating a method 200 for allowing presentation control of immediate content interrupting digital television channel programming in accordance with an embodiment of the inventive arrangements disclosed herein. Method 200 can be present in the context of scenario 100, 130, 140, 170, system 300, and/or embodiment 400. In method 200, a channel programming can be presented on a presentation device. An immediate content can be received which can interrupt channel programming. Immediate content can be non-intrusively displayed utilizing previously established settings such as user preferences. It should be appreciated that method 200 can be performed in real-time or near real-time.

In step 205, a channel programming can be selected. Selection can be automatically and/or manually selected. In step 210, selected programming can be presented on presentation device. In step 215, if an immediate content is received, the method can continue to step 217, else return to step 210. In step 217, the immediate content can interrupt programming. In one embodiment, a notification can be optionally presented indicating an immediate content is available for viewing. In step 220, if user preferences are established for immediate content, the method can continue to step 235, else proceed to step 225. In step 225, a preference configuration dialog can be optionally presented. For example, upon receiving of immediate content, an on-screen preferences dialog can permit content viewing configuration. In one instance, preferences can include presentation options based on content category (e.g., political, business, health, etc). In step 230, preferences can be processed and saved. In step 235, content can be conveyed based on preferences. For example, health news can be conveyed to a mobile phone and stored allowing a viewer to view the content at a later time (e.g., at the gym). In step 240, if more immediate content is received, the method can return to step 235, else continue to step 210.

Drawings presented herein are for illustrative purposes only and should not be construed to limit the invention in any regard. Steps 215-240 can be continually run while programming and/or content is presented. For example, steps 235-240 can be continually run for each immediate content received by a presentation device.

Figure 3:
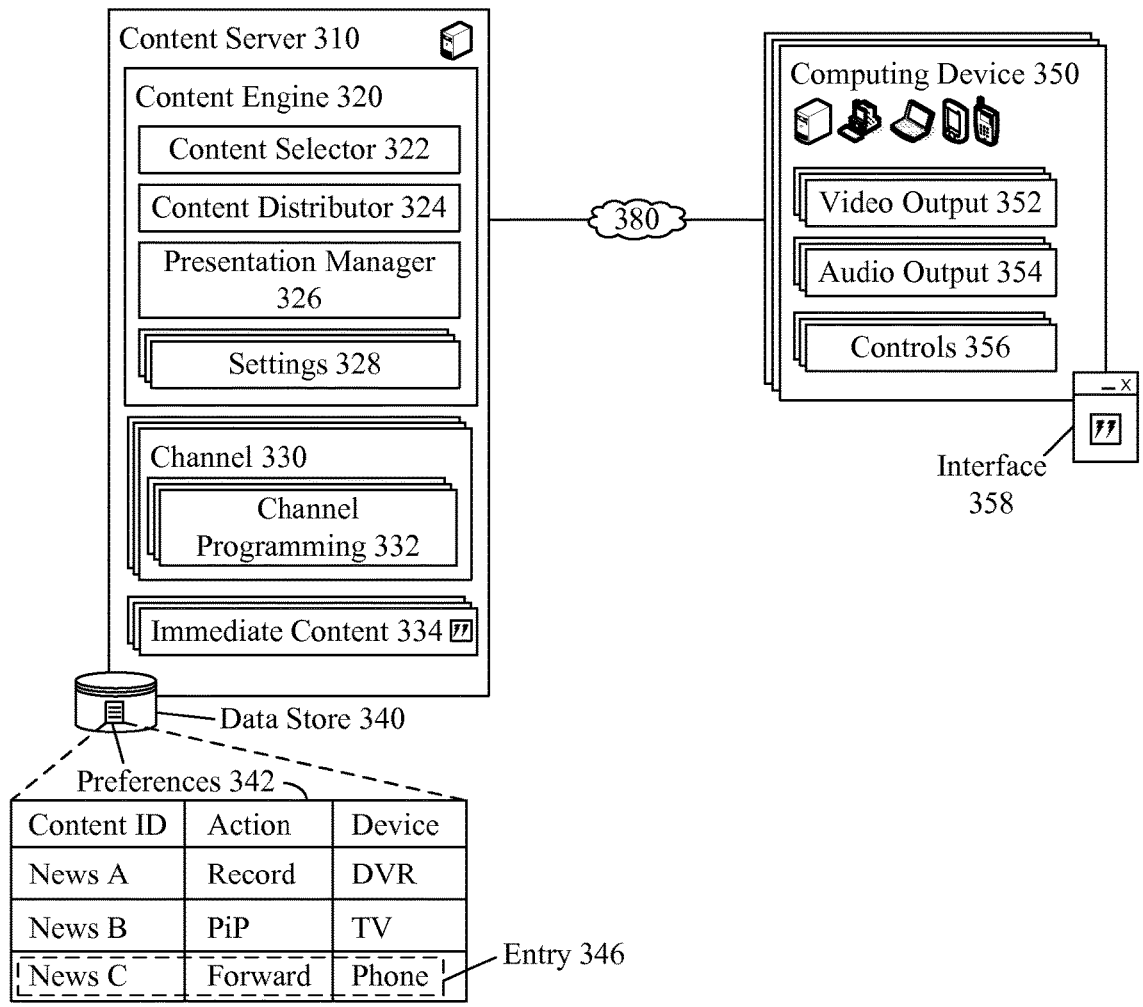
FIG. 3 is a schematic diagram illustrating a system for allowing presentation control of immediate content interrupting digital television channel programming in accordance with an embodiment of the inventive arrangements disclosed herein.

FIG. 3 is a schematic diagram illustrating a system 300 for allowing presentation control of immediate content interrupting digital television channel programming in accordance with an embodiment of the inventive arrangements disclosed herein. System 300 can be present in the context of scenario 100, 130, 140, 170, method 200, embodiment 400, and the like. In system 300, a content engine 320 can utilize preferences 342 to permit control over immediate content 334 presentation upon device 350. In one embodiment, engine 320 can be a component of a content server 310. Server 310 can be communicatively linked to device 350 via network 380.

Content server 310 can be a hardware/software entity for providing channel programming 332 and/or immediate content 334. Server 310 functionality can include, but is not limited to, authentication, communication handling, and the like. Server 310 can include, but is not limited to content engine 320, channel 330, immediate content 334, data store 340, and the like. In one embodiment, server 310 can be a component of a server oriented architecture (SOA). In one instance, server 310 can be a proxy server able to deliver programming 332 and/or content 334.

Content engine 320 can be a hardware/software component for permitting non-intrusive viewing content 334 on device 350. Engine 320 functionality can include, but is not limited to, content aggregation, content management, and the like. Engine 320 can include, but is not limited to, content selector 322, content distributor 324, presentation manager 326, settings 328, and the like. In one instance, engine 320 can be a component of a networked computing environment, distributed computing environment, and the like.

Content selector 322 can be a hardware/software component for determining content 334 to convey to device 350. Selector 322 functionality can include, but is not limited to, content 334 determination, content 334 verification, and the like. Selector 322 can utilize preferences 342 and/or settings 328 to select content 334. In one instance, historic content selection can be utilized to determine content 334. Selector 322 can utilize traditional and/or proprietary technology to select content 334.

Content distributor 324 can be a hardware/software element for conveying content 334 to device 350. Distributor 324 functionality can include, but is not limited to, content distribution, device 350 identification, presence tracking, and the like. Distributor 324 can utilize settings 328 and/or preferences 342 to intelligently distribute content 334. For example, when News C content is selected, the distributor 324 can automatically convey the content 334 to a mobile phone owned by a viewer. In one instance, distributor 324 can multiplex a content permitting multiple devices to receive the same content 334 simultaneously.

Presentation manager 326 can be a hardware/software component for controlling content 334 presentation. Manager 326 functionality can include, but is not limited to, content 334 notification, preference 342 option presentation, content 334 presentation, and the like. In one instance, manager 326 can be utilized to split audio and/or video of content 334 over two or more devices. For example, manager 326 can convey audio to an Internet-capable radio while conveying video to a mobile phone. In one embodiment, manager 326 can be presence aware permitting real-time and/or near real-time presentation of content 334 based on viewer location. In the embodiment, presence information can be utilized to determine proximate to a viewer of programming 332.

Settings 328 can be one or more options for configuring the behavior of system 300, server 310 and/or engine 320. Settings 328 can include, but is not limited to, selector 322 options, distributor 324 settings, manager 326 options, channel 330 options, content 334 settings, device 350 settings, and the like. Settings 328 can be manually and/or automatically established. In one instance, settings 328 can be heuristically determined. In the instance, a viewer profile of historic actions can be leveraged to determine content 334 selection, distribution, and/or presentation.

Channel 330 can be a physical radio frequency for conveying programming 332 which can correspond to a virtual channel numbering system. That is, channel 330 can be a viewer selectable channel via device 350. For example, channel 330 can be a channel number "4" having two virtual sub-channels "4.1" and "4.2". Channel 330 can include multiple channels, multiple sub-channels, multiple formats, and the like. Channel 330 can include channel programming 332 which can include live programming, pre-recorded programming, and the like. Programming 332 can include, free programming, paid programming, and the like.

Immediate content 334 can include a video stream, an audio stream, and the like. In one instance, content 334 can be real-time or near real-time. Content 334 can include, but is not limited to, interactive content, non-interactive content, and the like. In one instance, content 334 can include Web-based content. For example, content 334 can be a Really Simple Syndication (RSS) feed.

Data store 340 can be a hardware/software component able to store preferences 342, settings 328, programming 332, content 334, and the like. Data store 340 can be a Storage Area Network (SAN), Network Attached Storage (NAS), and the like. Data store 340 can conform to a relational database management system (RDBMS), object oriented database management system (OODBMS), and the like. Data store 340 can be communicatively linked to server 310 in one or more traditional and/or proprietary mechanisms. In one instance, data store 340 can be a component of Structured Query Language (SQL) compliant database.

Preferences 342 can be one or more settings for presenting immediate content 334 non-intrusively. Preferences 342 can include, but is not limited to, a content delivery option, a content presentation setting (e.g., preferences 138), a content identifier, a presentation action (e.g., forward), a device identifier, and the like. Preferences 342 can be automatically and/or manually established. In one instance, preferences 342 can be presented within interface 358.

Computing device 350 can be a hardware/software entity permitting the presentation of channel programming and/or immediate content 334. Device 350 can include, but is not limited to, video output 352, audio output 354, controls 356, and the like. Controls 356 can include, but is not limited to, playback controls, recording controls, display controls, and the like. Computing device 350 can include, but is not limited to, a desktop computer, a laptop computer, a tablet computing device, a personal digital assistant (PDA), a mobile phone, and the like. Computing device 350 can be communicatively linked with interface 358.

Interface 358 can be a user interactive component permitting presentation of immediate content 334 and/or programming 332. Interface 358 can be present within the context of a programming interface browser, a content browser, a Web browser application, and the like. In one embodiment, interface 358 can be a screen of a digital video recorder. Interface 358 capabilities can include a graphical user interface (GUI), voice user interface (VUI), mixed-mode interface, and the like. In one instance, interface 358 can be communicatively linked to computing device.

Network 380 can be an electrical and/or computer network connecting one or more system 300 components. Network 380 can include, but is not limited to, twisted pair cabling, optical fiber, coaxial cable, and the like. Network 380 can include any combination of wired and/or wireless components. Network 380 topologies can include, but is not limited to, bus, star, mesh, and the like. Network 380 types can include, but is not limited to, Local Area Network (LAN), Wide Area Network (WAN), Virtual Private Network (VPN) and the like.

Drawings presented herein are for illustrative purposes only and should not be construed to limit the invention in any regard. In one embodiment, engine 320 can include presence capabilities able to determine devices proximate to device 350 presenting a channel programming 332. In one embodiment, system 300 can be a component of a content delivery system.

Figure 4:
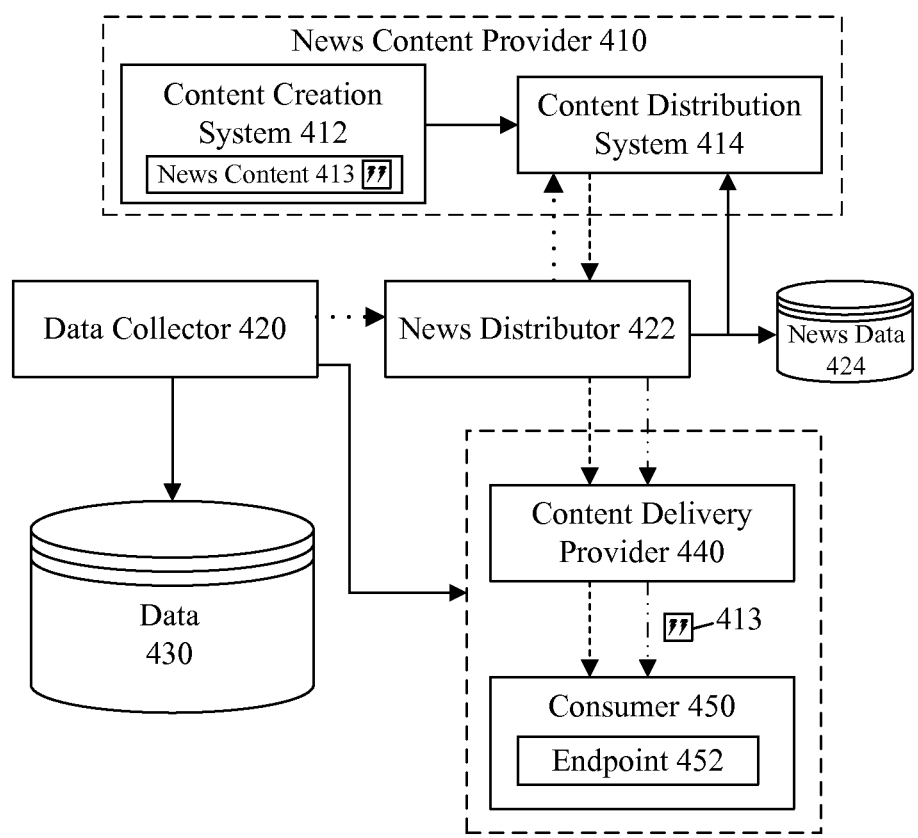
FIG. 4 is a schematic diagram illustrating an embodiment for allowing presentation control of immediate content interrupting digital television channel programming in accordance with an embodiment of the inventive arrangements disclosed herein.

FIG. 4 is a schematic diagram illustrating an embodiment 400 for allowing presentation control of immediate content interrupting digital television channel programming in accordance with an embodiment of the inventive arrangements disclosed herein. Embodiment 400 can be present in the context of scenario 100, 130, 140, 170, method 200, and/or system 300. In embodiment 400, live breaking news content can be distributed and non-intrusively presented to a consumer endpoint device.

In news content delivery system embodiment 400, news content 413 can be created from a content creation system 412 of a news content provider 410. Content creation system 412 can be for local, national, and/or worldwide news creation. In one instance, content 413 can be distributed by content distribution system 414 which can dynamically convey content 413 to multiple channels and/or endpoints. In another instance, content 413 can be optionally distributed by a different service provider or a cloud (e.g., news distributor 422) to specifically handle "breaking news". News content 413 can be delivered to a consumer 450 via content delivery provider 440 (e.g., set-top box) and can be presented on one or more endpoints 452. For example, news 413 can be delivered to a news application executing on a mobile phone via a news server residing within a cable box. In one embodiment, preferences (e.g., data 430) can be established for a content producer, a consumer endpoint device, and the like.

In one embodiment, data collector 420 can collect and/or manage viewer preferences, viewer recorded news, and the like. In the embodiment, marketing analysis can be leveraged to heuristically determine how news data 424 will be conveyed to a viewer. For example, data 430 can indicate that many viewers set a pre-defined "Breaking News" default location (e.g., upper right corner with a size of 10%) which can be suggested as a default setting for a new viewer.

Drawings presented herein are for illustrative purposes only and should not be construed to limit the invention in any regard. Embodiment 400 illustrates one configuration of the disclosure and can vary with implementation. In one instance, embodiment 400 can be a Service Oriented Architecture (SOA).

The flowchart and block diagrams in the FIGS. 1-4 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be handled in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for controlling immediate content presentation comprising:
    selecting a channel programming associated with a channel, wherein the channel is associated with a programming broadcasting system;
    displaying the channel programming upon a presentation device;
    receiving an immediate content from a content delivery entity interrupting the presentation of the channel programming;
    automatically determining presentation preferences for the immediate content with the channel programming, wherein at least one of the presentation preferences is a time of presentation; and
    simultaneously presenting the channel programming and the immediate content on the presentation device.

2. The method of claim 1, wherein the immediate content is a breaking news content.

3. The method of claim 1, wherein at least one of the channel programming and the immediate content is presented in a picture within a picture (PiP) functionality.

4. The method of claim 1, wherein the immediate content is overlayed on the channel programming.

5. The method of claim 1, wherein the immediate content is automatically recorded to a data store communicatively linked to the presenting device.

6. The method of claim 1, wherein at least one of the video and the audio of the immediate content is presented on a different presentation device proximately located to the presentation device.

7. The method of claim 1, wherein a dialog associated with preferences for the immediate content presentation is displayed prior to the presenting of the content.

8. The method of claim 1, wherein the immediate content is received within a sub-channel of the channel.

9. The method of claim 1, wherein the channel programming is presented by a tuner associated with the presentation device, wherein the immediate content is presented by a plurality of tuners associated with the presentation device or a different presentation device.

* * * * *